United States Patent
Blomberg et al.

[15] 3,681,938
[45] Aug. 8, 1972

[54] ABSORPTION REFRIGERATION APPARATUS OF THE INERT GAS TYPE

[72] Inventors: Peter Erik Blomberg, Stockholm; Lars Sivert Enger, Bandhagen, both of Sweden

[73] Assignee: Aktiebolaget Electrolux, Stockholm, Sweden

[22] Filed: March 9, 1971

[21] Appl. No.: 122,412

[30] Foreign Application Priority Data

May 28, 1970 Sweden ..................... 7373/70

[52] U.S. Cl. ...................... 62/490, 62/494, 62/527, 165/179
[51] Int. Cl. ............................................. F25b 15/10
[58] Field of Search........62/490, 492, 491, 494, 527; 137/561 A; 165/179

[56] References Cited

UNITED STATES PATENTS

| | | | |
|---|---|---|---|
| 2,307,947 | 1/1943 | Payne | 62/491 |
| 2,408,480 | 10/1946 | Reid, Jr. | 62/494 X |
| 2,426,044 | 8/1947 | O'Brien | 62/494 X |
| 2,691,281 | 10/1954 | Phillips | 62/494 |
| 2,804,757 | 9/1957 | Ullstrand et al. | 62/494 X |
| 3,078,690 | 2/1963 | Phillips et al. | 62/494 X |

*Primary Examiner*—William F. O'Dea
*Assistant Examiner*—P. D. Ferguson
*Attorney*—Edmund A. Fenander

[57] ABSTRACT

Liquid flows in the presence of an inert gas in heat transfer members, such as the evaporator and absorber, of an inert gas circuit of absorption refrigeration apparatus. The heat transfer members are formed by piping which slopes downward and is inclined at an acute angle to the horizontal and has a plurality of internal helical capillary grooves extending lengthwise of the piping. Liquid is supplied to the piping by a conduit which extends therein and terminates in a discharge opening. The discharge opening faces the upper inner surface of the piping and is at such distance therefrom that liquid outside the opening which forms at such region, due to the surface tension of the liquid, physically contacts the inner surface.

5 Claims, 4 Drawing Figures

PATENTED AUG 8 1972

PATENTED AUG 8 1972 3,681,938

ABSORPTION REFRIGERATION APPARATUS OF THE INERT GAS TYPE

BACKGROUND OF THE INVENTION

1. Field of the Invention

Our invention relates to absorption refrigeration apparatus in which the evaporator and absorber function as heat transfer members and form parts of an inert gas circuit in each of which liquid flows in the presence of the gas. In the evaporator liquid refrigerant flows in the presence of inert gas and evaporates and diffuses into the gas with consequent absorption of heat through the evaporator walls from the surroundings of the evaporator. In the absorber absorption liquid flows in the presence of insert gas which has been enriched by refrigerant in the evaporator. The absorption liquid, due to absorption of refrigerant vapor from the gas mixture formed in the evaporator, becomes heated and such heat is conducted through the absorber walls and given up to surrounding cooling air flowing in heat exchange relation with the absorber.

2. Description of the Prior Art

The evaporator and absorber of absorption refrigeration apparatus of the inert gas type are usually formed of piping which is inclined to the horizontal and through which liquid flows downward by gravity in the presence of the gas. In order for these components to function efficiently as heat transfer members the surface contact between the gas and liquid at the wall areas of the members should be at a maximum. This is achieved by effecting flow of liquid in such manner that the liquid will come in contact with as much of the wall area as possible.

In known absorption refrigeration apparatus of this kind the piping has been formed with internal capillary grooves which extend longitudinally of the piping and are helical. In order to effect distribution of liquid at the region it is introduced into the piping it has been the practice heretofore to provide an upright end section for the inclined piping and capillary material for spreading liquid about the entire inner surface of the upright section from which the liquid then flows through the inclined piping. Liquid also has been distributed by capillary action about the upper ends of straight piping sections which slope downward. Such liquid distribution has been effected by ring-shaped capillary grooves extending about the piping at their inner surfaces and by capillary material, such as screening, which functions to lift liquid about the inner surfaces of the piping at the inlet ends of the longitudinal capillary grooves. Such arrangements for distributing liquid at the inlets of piping all rely upon capillary action which is objectionable because this increases manufacturing costs.

SUMMARY OF THE INVENTION

It is an object of our invention to provide an improvement for increasing the effectiveness of gas and liquid contact in piping having internal grooves which are helical and extend lengthwise within the piping. More particularly, liquid is supplied to the inlet end of the piping by initially bringing the liquid into physical contact with the upper part of the inner surface of the piping. With this arrangement liquid spreads out in the upper part of the piping and, with the aid of gravity, is effectively distributed about the entire inner surface of the piping at the inlet end thereof.

We accomplish this by supplying liquid to the piping by a conduit which terminates in an opening which is disposed within the piping and from which the liquid is discharged. The discharge opening faces the upper inner surface of the piping and is at such a distance therefrom that liquid outside the opening which forms at such region, due to the surface tension of the liquid, physically contacts the inner surface.

DESCRIPTION OF THE PREFERRED EMBODIMENT

Figure 1:
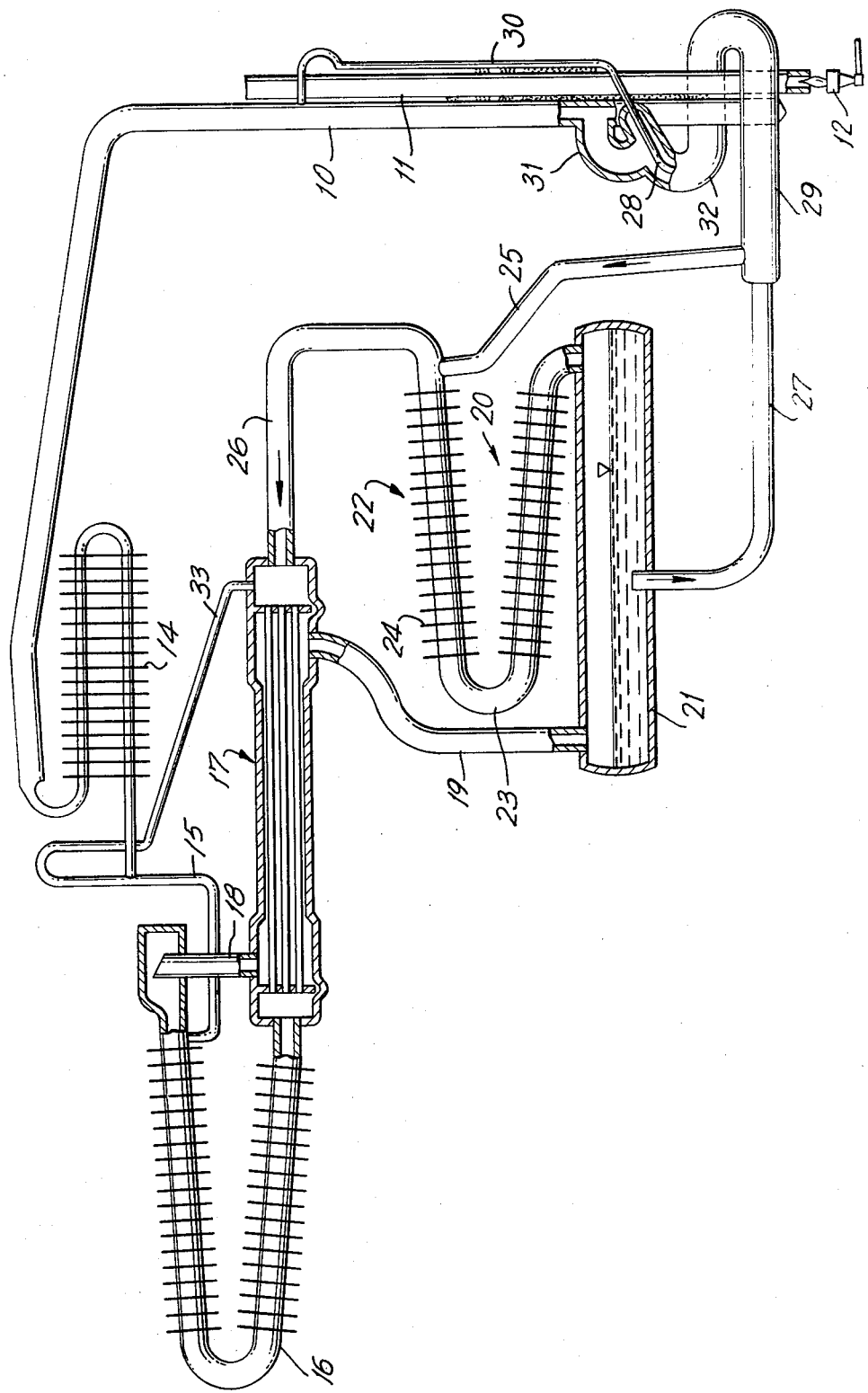
FIG. 1 is a view more or less diagrammatically illustrating absorption refrigeration apparatus of the inert gas type having conduits embodying our invention for distributing liquid and promoting surface contact between such liquid and a gas.

Referring to the drawing, we have shown our invention in connection with an absorption refrigeration system of a uniform pressure type which is well known in the art and in which an inert pressure equalizing gas is employed. Such a refrigeration system comprises a generator or boiler 10 containing a refrigerant, such as ammonia, in solution in a body of absorption liquid, such as water. Heat may be supplied to the boiler 10 from a heating tube or flue 11 thermally connected therewith, as by welding. The heating tube 11 may be heated in any suitable manner, as by an electrical heating element positioned therein or by a liquid or gaseous fuel burner 12, for example, which is adapted to project its flame into the lower end of the tube.

The heat supplied to the boiler 10 and its contents expels refrigerant vapor out of solution, and the vapor thus generated flows to an air cooled condenser 14 in which it is condensed and liquefied. Liquid refrigerant flows from condenser 14 through a conduit 15 into a cooling element 16 in which it evaporates and diffuses into an inert pressure equalizing gas, such as hydrogen, which enters the lower part thereof from a gas heat exchanger 17. Due to evaporation of refrigerant fluid into inert gas, a refrigerating effect is produced with consequent absorption of heat from the surroundings.

The rich gas mixture of refrigerant vapor and inert gas formed in cooling element 16 flows from the upper part thereof through a conduit 18, gas heat exchanger 17, conduit 19 and absorber 20 comprising a vessel 21 and a coil 22 formed of piping 23 which is provided with a plurality of heat dissipating elements or fins 24. In the absorber coil 22 the rich gas mixture flows countercurrent to downwardly flowing absorption liquid which enters through a conduit 25. The absorption liquid absorbs refrigerant vapor from inert gas, and inert gas weak in refrigerant flows from the upper part of the absorber coil in a path of flow including a conduit 26 and the gas heat exchanger 17 into the lower part of cooling element 16.

Absorption solution flows downwardly through coil 22 into the absorber vessel 21 and such solution, which is enriched in refrigerant, passes from the vessel through a conduit 27 and an inner passage or pipe 28 of liquid heat exchanger 29 which is in thermal exchange relation with the heating tube 11, as by welding. Liquid is raised by vapor-liquid lift action through pipe 30 into the upper part of boiler 10. Refrigerant vapor expelled out of solution in boiler 10, together with refrigerant vapor entering through pipe 30, flows upwardly from the boiler to the condenser 14, as previously explained. The absorption liquid from which refrigerant vapor has been expelled flows from the boiler 10 through a connection 31, an outer pipe or passage 32 of the liquid heat exchanger 29 and conduit 25 into the upper part of the absorber coil 22. The circulation of absorption solution in the liquid circuit just described is effected by raising of liquid through pipe 30.

The outlet end of the condenser 14 is connected by an upper extension of conduit 15 and a conduit 33 to a part of the gas circuit, as to the gas heat exchanger 17, for example, so that any inert gas which may pass through the condenser 14 can flow into the gas circuit. The circulation of gas in the gas circuit is due to the difference in specific weight of the columns of gas rich and weak, respectively, in refrigerant vapor. Since the column of gas rich in refrigerant vapor and flowing from cooling element 16 to the absorber coil 22 is heavier than the gas weak in refrigerant and flowing from the absorber coil to cooling element 16, a force is produced or developed within the system for causing circulation of inert gas in the manner described.

Figure 2:
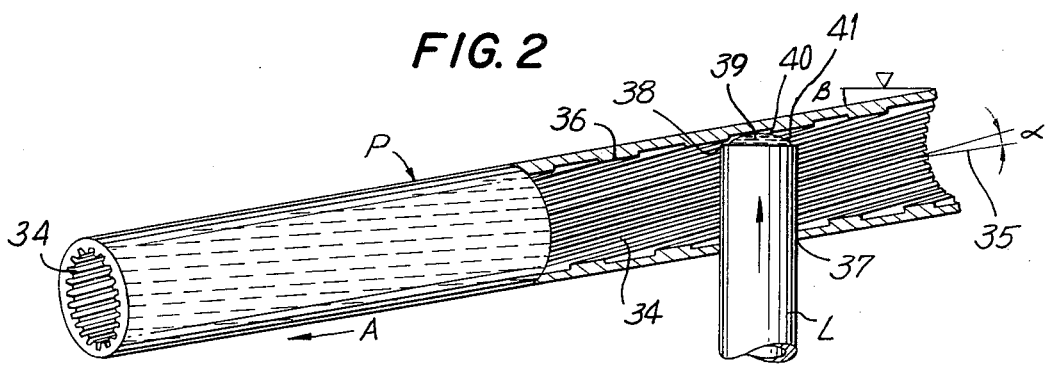
FIG. 2 is a fragmentary view of conduits, partly broken away and in section, illustrating one embodiment of our liquid distributing and liquid-gas contact construction incorporated in FIG. 1.

In FIG. 2 we have shown piping P which can be employed as the piping in the cooling element or evaporator 16 and in the absorber 23. The piping P is formed with internal longitudinally extending grooves 34 which are essentially square-shaped in section and at a definite acute angle $\alpha$ (Alpha) to the generatrix 35 of the piping. As seen in FIG. 2, the generatrix also defines the slope of the piping P which is at a definite angle $\beta$ (Beta) to the horizontal. In order that liquid will spread over the entire inner surface of the piping P, the angles $\alpha$ and $\beta$ desirably should be related in a definite manner with respect to one another.

Complete wetting of the inner wall of the piping P is achieved when the angle $\alpha$ is about 6° and the angle $\beta$ is 10°. With the grooves 34 at an acute angle of 6° to the generatrix 35 of the piping and the piping inclined at an acute angle of about 10° to the horizontal, liquid effectively flows in the grooves 34 to the top part of the piping P. Further, when the liquid reaches the top part or ceiling of the piping, part of the liquid flows over the ridges 36 between the grooves and flows downward along the inner wall surface of the piping, so that the liquid will spread over a maximum surface area within the piping.

When the capillary grooves 34 are relatively narrow and have a width less than about 0.8 mm., and the bottom of each groove is formed with a sharp radius, the grooved surface effectively functions to raise liquid by capillary action at one side of the piping and such raised liquid will flow to the opposite side thereof to promote complete wetting of the piping by the liquid distributed by the grooves. In the part of FIG. 2 which is partly broken away, it will be seen that the grooves 34 at the rear of the piping are inclined downward in the direction of liquid flow indicated by the arrow A. Hence, liquid will flow by gravity in such grooves at the rear of the piping P after reaching the top part of the piping by capillary action in the manner just explained.

In FIG. 2 the difference between the angle $\alpha$ and the angle $\beta$ desirably should not be less than 2° and not greater than 5°. When this difference is too small the liquid will spread too slowly over the inner wall surface of the piping, and when this difference is too large, the inclination of the piping to the horizontal must be increased to effect continuous flow of liquid. Refrigeration apparatus, in which piping like that shown in FIG. 2 is incorporated, will operate most reliably and with highest efficiency when the difference between the angle $\alpha$ and the angle $\beta$ is between 3° and 4.5°.

In accordance with our invention, in order to increase the effectiveness of gas and liquid contact in the piping P, liquid is supplied thereto through a conduit L which can be either the liquid supply conduit 15 or the absorption liquid supply conduit 25 in FIG. 1. The conduit L extends vertically upward in the piping P through an opening 37 in the bottom thereof. The upper end of the conduit L terminates in an opening 38 from which liquid is discharged.

The discharge opening 38 faces the upper inner surface of the piping P and is at such a distance therefrom that liquid 39 outside the opening 38, which forms at such region due to the surface tension of the liquid, physically contacts the inner surface at 40. Stated another way, a meniscus of the character indicated by the solid line 41 is formed at the discharge opening 38 of the conduit L. Hence, the liquid 39 outside the opening 38 has a convex upper surface which strikes the upper part of the inner grooved surface of the piping P.

The rate at which liquid is supplied through the conduit L to the piping P is sufficient so that the grooves 34 at the region 40 will not be capable of carrying away all of the liquid from this region and some of the liquid will pass over the ridges 36 into adjacent grooves 34. The flow of liquid from successive grooves 34 over the ridges 36 takes place without interruption; and eventually the inner surface of a short length of the side walls of the piping P at the vicinity of the conduit L will be completely wetted by the liquid. In addition, some liquid will overflow from the discharge opening 38 of the conduit L and flow to the bottom of the piping and spread over the grooves 34 in the lower part of the inner surface. In this way complete spreading of liquid over the entire inner surface of the piping P is effectively accomplished. The liquid distributed within the piping P at the region of the conduit L flows therefrom in the grooves 34 in the manner explained above.

Figure 3:
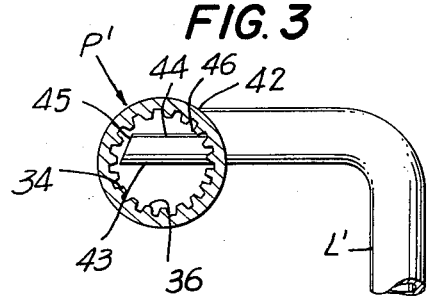
FIG. 3 is a transverse cross-sectional view of a conduit like that shown in FIG. 2 and a liquid supply conduit therefor illustrating another embodiment of the invention.

Another embodiment of our invention is shown in FIG. 3 in which a liquid supply conduit L' extends horizontally across the upper part of piping P' through an opening 42 in a side wall thereof. The extreme end portion of the conduit L' within the piping P', indicated at 43, has the top part thereof cut off. Hence, the end portion 43 has half the diameter of the conduit L' disposed outside the piping P'. As in the first described embodiment of FIG. 2, the end portion 43 of the conduit L' has its top opening 44 facing the upper inner surface of the piping P'. The end 45 of the conduit L' is so close to the inner side wall of the piping P' that part of the liquid supplied will be transferred to the wall. Further, the liquid is supplied in pulses from the boiler and, therefore, liquid will also flow over to the wall at the point 46 where liquid enters piping P'. As explained above in connection with the embodiment of FIG. 2, liquid will physically contact the inner surface of the piping. In this way liquid will flow from groove to groove over the ridges 36 to completely wet the inner surface of the piping P' at the vicinity of the conduit L'.

Figure 4:
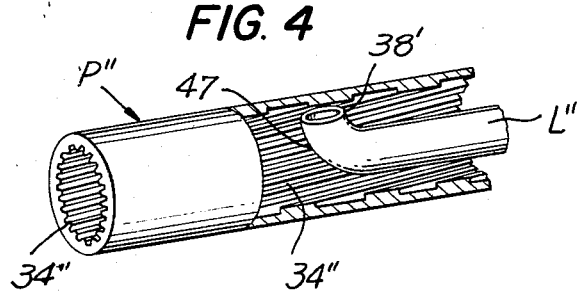
FIG. 4 is a fragmentary view of a conduit like that shown in FIG. 2, partly broken away and in section, and a liquid supply conduit therefor illustrating still another embodiment of the invention.

A further embodiment is shown in FIG. 4 in which a conduit L'' for supplying liquid to the piping P'' extends lengthwise within the piping. The conduit L'' is provided with an upturned end 47 terminating in a discharge opening 38' which faces the upper inner surface of the piping. The opening 38' is at such a distance from the upper grooved surface of the piping that liquid outside such opening physically contacts the inner grooved surface in the same manner as in FIG. 2 and described above.

The following claims are directed to the manner in which liquid is supplied through conduits L, L' and L'' to piping P, P' and P'', respectively, each of which is inclined at an acute angle to the horizontal and formed with internal longitudinal capillary grooves. In FIGS. 2, 3 and 4 the part of each conduit L, L' and L'' within the piping P, P' and P'', respectively, has a discharge opening facing the upper inner surface of the piping which is at such a distance therefrom that liquid outside the opening, which forms at such region due to the surface tension of the liquid, physically contacts the inner surface. However, the features embodied in the inclined piping having internal longitudinal capillary grooves and like that best illustrated in FIG. 2 are being claimed in copending Peter Erik Blomberg application Ser. No. 122,413, filed Mar. 9, 1971.

We claim:

1. In absorption refrigeration apparatus having an inert gas circuit,
   a. a heat transfer member in said circuit comprising piping inclined at an acute angle to the horizontal,
   b. conduit means for supplying liquid to said piping,
   c. means at the inner wall of said piping defining paths of flow for the liquid, said means comprising a plurality of longitudinal capillary grooves which are at an acute angle to the generatrix of said piping and disposed alongside one another with successive regions of said grooves in the direction of liquid flow being located at progressively different vertical distances from a horizontal plane intersecting said grooves, and
   d. said conduit means extending within said piping means and terminating in an opening from which liquid is discharged,
   e. the part of said conduit means disposed within said piping having the discharge opening facing the upper inner surface of said piping and at such a distance therefrom that liquid outside the opening which forms at such region, due to the surface tension of the liquid, physically contacts the inner surface.

2. Apparatus as set forth in claim 1 in which the bottom of said piping is formed with an opening, said conduit means extending vertically upward into said piping through said opening and having its discharge opening closely adjacent to the upper inner surface of said piping.

3. Apparatus as set forth in claim 1 in which said conduit means is disposed within said piping and has an upwardly bent end terminating in said discharge opening which is disposed closely adjacent to the upper inner surface of said piping.

4. Apparatus as set forth in claim 3 in which said conduit means within said piping extends lengthwise of the latter.

5. Apparatus as set forth in claim 1 in which said piping is formed with an opening in a lateral side thereof, said conduit means extending horizontally into said piping through said opening, the extreme end of said conduit means within said piping having its top part cut off to form said opening from which liquid is discharged from said conduit means, the liquid at the outside of the last-mentioned opening physically contacting the upper inner surface of said piping.

* * * * *